US010449642B2

(12) United States Patent
Yamane et al.

(10) Patent No.: US 10,449,642 B2
(45) Date of Patent: Oct. 22, 2019

(54) NUT RUNNER SYSTEM

(71) Applicant: KAWASAKI JUKOGYO KABUSHIKI KAISHA, Kobe-shi, Hyogo (JP)

(72) Inventors: Hideshi Yamane, Kakogawa (JP); Jun Takebayashi, Kakogawa (JP); Shuhei Kuraoka, Akashi (JP); Hiroyuki Mizumoto, Kobe (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 68 days.

(21) Appl. No.: 15/573,496

(22) PCT Filed: Apr. 27, 2016

(86) PCT No.: PCT/JP2016/002209
§ 371 (c)(1),
(2) Date: Nov. 13, 2017

(87) PCT Pub. No.: WO2016/181629
PCT Pub. Date: Nov. 17, 2016

(65) Prior Publication Data
US 2018/0141172 A1    May 24, 2018

(30) Foreign Application Priority Data

May 11, 2015 (JP) .................................. 2015-096180

(51) Int. Cl.
*B23P 19/06* (2006.01)
*B25B 21/00* (2006.01)
(Continued)

(52) U.S. Cl.
CPC ............ *B23P 19/06* (2013.01); *B23B 31/263* (2013.01); *B25B 21/00* (2013.01); *B25B 23/0035* (2013.01)

(58) Field of Classification Search
CPC ... B23B 31/1071; B23B 31/263; B23B 31/06; B23B 2260/136; B23B 2270/22;
(Continued)

(56) References Cited

U.S. PATENT DOCUMENTS 8,366,592 B2 * 2/2013 Hathaway ........... B23B 31/1071
                                                    279/2.12
8,371,775 B2 * 2/2013 Miyanaga ............... B23B 31/06
                                                    279/20
(Continued)

FOREIGN PATENT DOCUMENTS

CN    201455639 U    5/2010
CN    104400409 A    3/2015
(Continued)

OTHER PUBLICATIONS

Jul. 5, 2016 International Search Report issued in International Patent Application No. PCT/JP2016/002209.
(Continued)

*Primary Examiner* — David B. Thomas
(74) *Attorney, Agent, or Firm* — Oliff PLC

(57) ABSTRACT

Nut runner system which includes holder table having tightening point at one end and coupling part at other end, and configured to hold plurality of bits, and nut runner main body including carrier coupled to wrist part of robotic arm, spindle supported by carrier, and bit changer coupled to spindle and which one of plurality of bits is attached. Coupling part of each of plurality of bits has an engaging hole coaxial with tightening point, and annular protrusion that continues in circumferential directions is formed in inner circumferential surface of engaging hole. Bit changer includes actuator, actuator made of engaging shaft to be inserted into engaging hole and operating pieces formed in engaging shaft, operating pieces moving between engaging position wherein operating pieces protrude radially outward from inner circumferential edge of annular protrusion and retracted position wherein operating pieces are retracted radially inward from inner circumferential edge of annular protrusion.

5 Claims, 11 Drawing Sheets

(51) Int. Cl.
*B23B 31/26* (2006.01)
*B25B 23/00* (2006.01)

(58) Field of Classification Search
CPC .. B25B 23/0035; B25B 21/00; B25J 15/0416; B25J 15/0019; B23P 19/06; Y10T 483/18
See application file for complete search history.

(56) References Cited

U.S. PATENT DOCUMENTS

| | | | |
|---|---|---|---|
| 8,591,389 B2 * | 11/2013 | Tomioka | ................ B23B 31/06 483/55 |
| 2009/0139375 A1 | 6/2009 | Hathaway et al. | |

FOREIGN PATENT DOCUMENTS

| | | |
|---|---|---|
| JP | H04-183584 A | 6/1992 |
| JP | H04-360732 A | 12/1992 |
| JP | H09-173624 A | 7/1997 |
| JP | 2005-088168 A | 4/2005 |
| JP | 3141901 U | 5/2008 |
| JP | 2009-0013732 A | 1/2009 |
| TW | M314090 U | 6/2007 |
| TW | 200726589 A | 7/2007 |
| TW | M318477 U | 9/2007 |
| TW | 200920543 A | 5/2009 |

OTHER PUBLICATIONS

Jan. 18, 2017 Search Report issued in Taiwanese Patent Application No. 105113687.

* cited by examiner

NUT RUNNER SYSTEM

TECHNICAL FIELD

The present disclosure relates to a nut runner system for tightening a screw.

BACKGROUND ART

Conventionally, screws are tightened using a robot in, for example, an automated assembly line of various devices. For example, Patent Document 1 discloses a nut runner system in which a nut runner main body attached to a wrist part of a robotic arm is capable of mechanically equipped with one of a plurality of bits.

In more detail, as illustrated in FIG. 10, a nut runner main body 100 of the nut runner system disclosed in Patent Document 1 includes a bit changer 110 to which one of a plurality of bits 160 held by a holder table 170 (see FIG. 11) is attached.

The bit changer 110 includes a hollow shaft 120, an inner slide member 130 disposed inside the hollow shaft 120, and an outside slide member 140 disposed outside the hollow shaft 120. A plurality of notches 121 are formed at suitable locations of the hollow shaft 120, and balls 150 are disposed inside the notches 121, respectively. Moreover, recesses 141 into which the balls 150 fit are formed in the outside slide member 140.

A recess 161 which opens radially outward is formed in an upper part of each bit 160. When the upper part of the bit 160 is inserted into the hollow shaft 120 of the bit changer 110, the inner slide member 130 is pushed by the bit 160 to move upwardly. Then, the balls 150 fit into the recess 161 and the outside slide member 140 moves downwardly. Therefore, the bit 160 is attached to the bit changer 110.

In order to remove the bit 160 from the bit changer 110, the outside slide member 140 is moved upwardly. Then, the balls 150 fit into the recesses 141 of the outside slide member 140, and the bit 160 is able to be slipped out from the hollow shaft 120. As illustrated in FIG. 11, a projection 171 is formed in the holder table 170 in order to move the outside slide member 140 upwardly.

REFERENCE DOCUMENT OF CONVENTIONAL ART

Patent Document

[Patent Document 1] JP2005-088168A

DESCRIPTION OF THE DISCLOSURE

Problems to be Solved by the Disclosure

However, in the nut runner system disclosed in Patent Document 1, as illustrated in FIG. 11, a position without the projection 171 of the holder table 170 is an attaching position P1 of the bit 160, and a position with the projection 171 is a removal position P2 of the bit 160. Therefore, in order to repeatedly use the same bit 160, it is necessary to move the bit 160 from the removal position P2 to the attaching position P1 while maintaining by the robot in the state where the bit 160 is able to be slipped out from the hollow shaft 120 when removing the bit 160 from the bit changer 110.

Therefore, the purpose of the present disclosure is to provide a nut runner system, which can attach and remove a bit at the same location of a holder table.

Summary of the Disclosure

In order to solve the above problem, according to one aspect of the present disclosure, a nut runner system is provided, which includes a holder table having a tightening point at one end and a coupling part at the other end, and configured to hold a plurality of bits, and a nut runner main body including a carrier coupled to a wrist part of a robotic arm, a spindle supported by the carrier, and a bit changer coupled to the spindle and to which one of the plurality of bits is to be attached. The coupling part of each of the plurality of bits has an engaging hole coaxial with the tightening point, and an annular protrusion that continues in circumferential directions is formed in an inner circumferential surface of the engaging hole. The bit changer includes an actuator, the actuator being comprised of an engaging shaft to be inserted into the engaging hole and operating pieces formed in the engaging shaft, the operating pieces moving between an engaging position at which the operating pieces protrude radially outward from an inner circumferential edge of the annular protrusion and a retracted position at which the operating pieces are retracted radially inward from the inner circumferential edge of the annular protrusion.

According to this structure, when the operating pieces are moved radially outward in a state where the engaging shaft of the actuator included in the bit changer is inserted into the engaging hole of the bit, the bit can be attached to the bit changer. On the other hand, when the operating pieces are moved radially inward, the bit can be removed from the bit changer. Therefore, the bit can be attached to and removed from the holder table at the same location.

The actuator may be driven by hydraulic pressure. The spindle may be of a tubular shape, and a tube through which the hydraulic pressure is supplied to the actuator may be routed inside the spindle. According to this structure, the tube for the actuator which is driven by the hydraulic pressure can be hidden inside the spindle near the bit changer.

The actuator may maintain the operating pieces at the engaging position when the hydraulic pressure is not supplied to the actuator through the tube, while the actuator may move the operating pieces to the retracted position when the hydraulic pressure is supplied to the actuator through the tube. According to this structure, a fall of the bit from the bit changer can be prevented even if the hydraulic pressure is no longer supplied to the actuator due to power failure etc.

The nut runner main body may include a guide that unrotatably fits to the spindle and supports the spindle so as to be axially slidable, a driven gear fixed to the guide, a drive gear that meshes with the driven gear, and a spring that biases the spindle toward the bit changer. According to this structure, it can prevent that the tightening point of the bit is pushed by an excessive force against a target screw to be tightened.

For example, a stop member may be fixed to an end of the spindle opposite from the bit changer. The nut runner main body may include a sleeve fixed to the carrier and fitted onto the spindle, and a collar that is rotatably supported by the sleeve through a bearing and contacts the stop member.

The coupling part of each of the plurality of bits may have a rotation-stop hole parallel to the engaging hole. The bit changer may have a rotation-stop pin to be inserted into the rotation-stop hole. According to this structure, the bit changer and the coupling part of the bit can be formed in simple shapes in which they contact each other with flat surfaces.

The holder table may have holder holes into which the plurality of bits are inserted, and the holder table may be constructed so that the coupling parts of the plurality of bits are placed on the holder table. The coupling parts of the plurality of bits may be of a disk shape, and at least two positioning slots may be formed in perimeter surfaces of the coupling parts at mutually different locations, respectively. The holder table may be provided, for each of the plurality of bits, with at least two positioning pins to be fitted into the at least two positioning slots. According to this structure, a faulty insertion of the bit into the holder hole by a worker is prevented.

Effect of the Disclosure

According to the present disclosure, the bit can be attached and removed at the same location of the holder table.

MODE FOR CARRYING OUT THE DISCLOSURE

Figure 1:
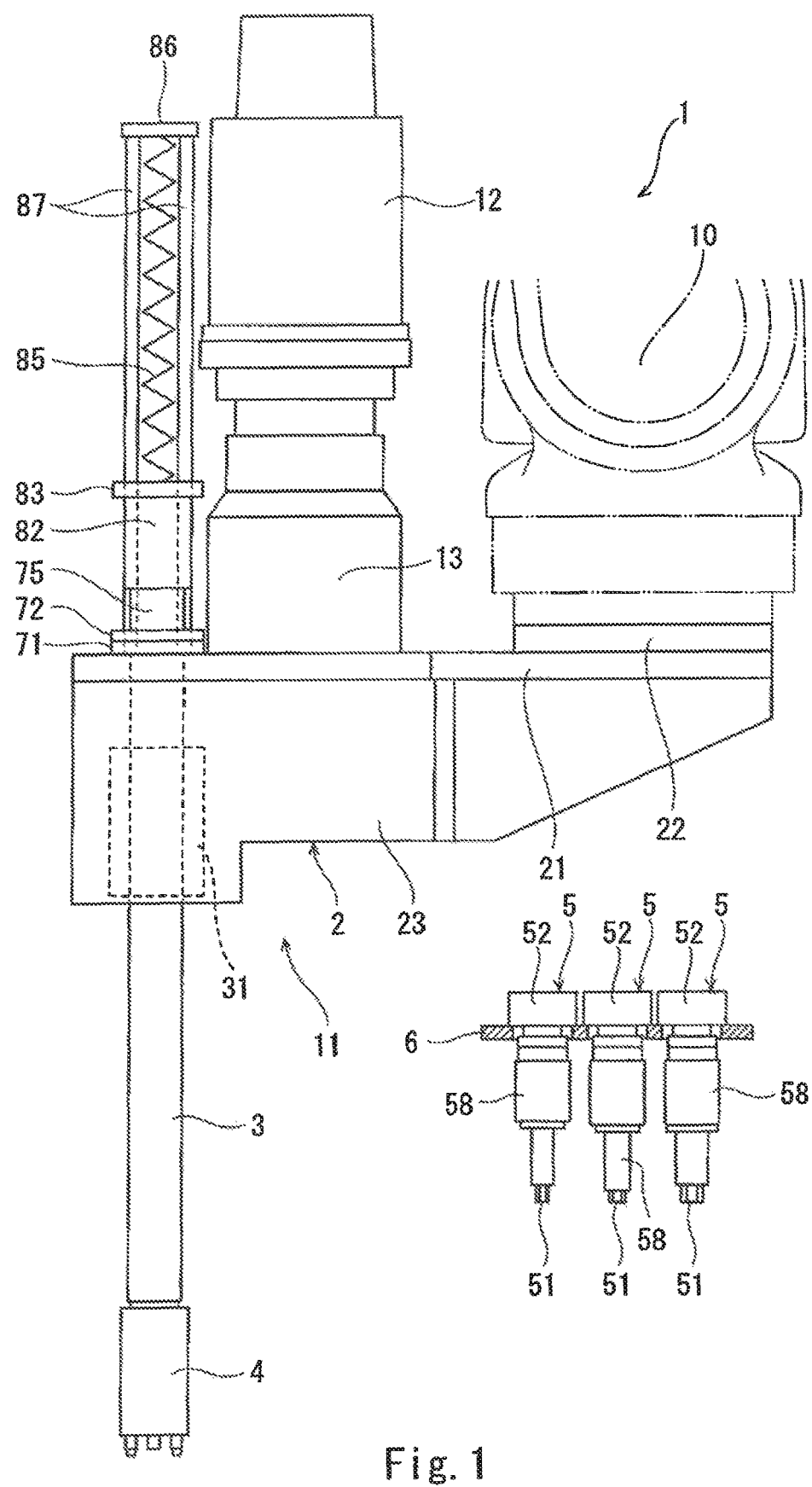
FIG. 1 is a side view of a nut runner main body and a cross-sectional view of a holder table, in a nut runner system according to one embodiment of the present disclosure.

FIG. 1 illustrates a nut runner system 1 according to one embodiment of the present disclosure. This nut runner system 1 is for tightening a screw (e.g., a bolt with a hexagon socket), and includes a holder table 6 which holds a plurality of bits 5 and a nut runner main body 11. Note that, in FIG. 1, although the holder table 6 is drawn directly under a wrist part 10 of the robotic arm for convenience of drawing, the exact location of the holder table 6 is below a bit changer 4 (described later).

The nut runner main body 11 includes a carrier 2 coupled to the wrist part 10 of the robotic arm, a spindle 3 which is supported by the carrier 2 and extends in vertical directions, and the bit changer 4 coupled to the spindle 3. One of the plurality of bits 5 is to be attached to the bit changer 4.

Figure 2:
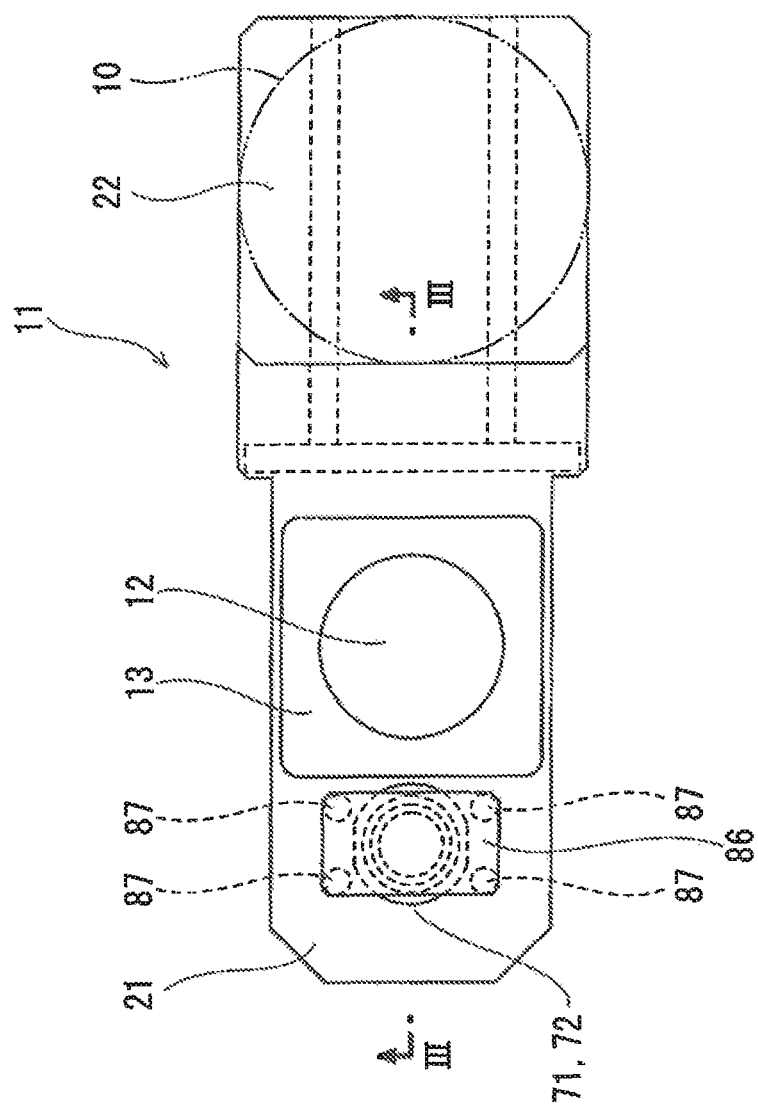
FIG. 2 is a plan view of the nut runner main body.
Figure 3:
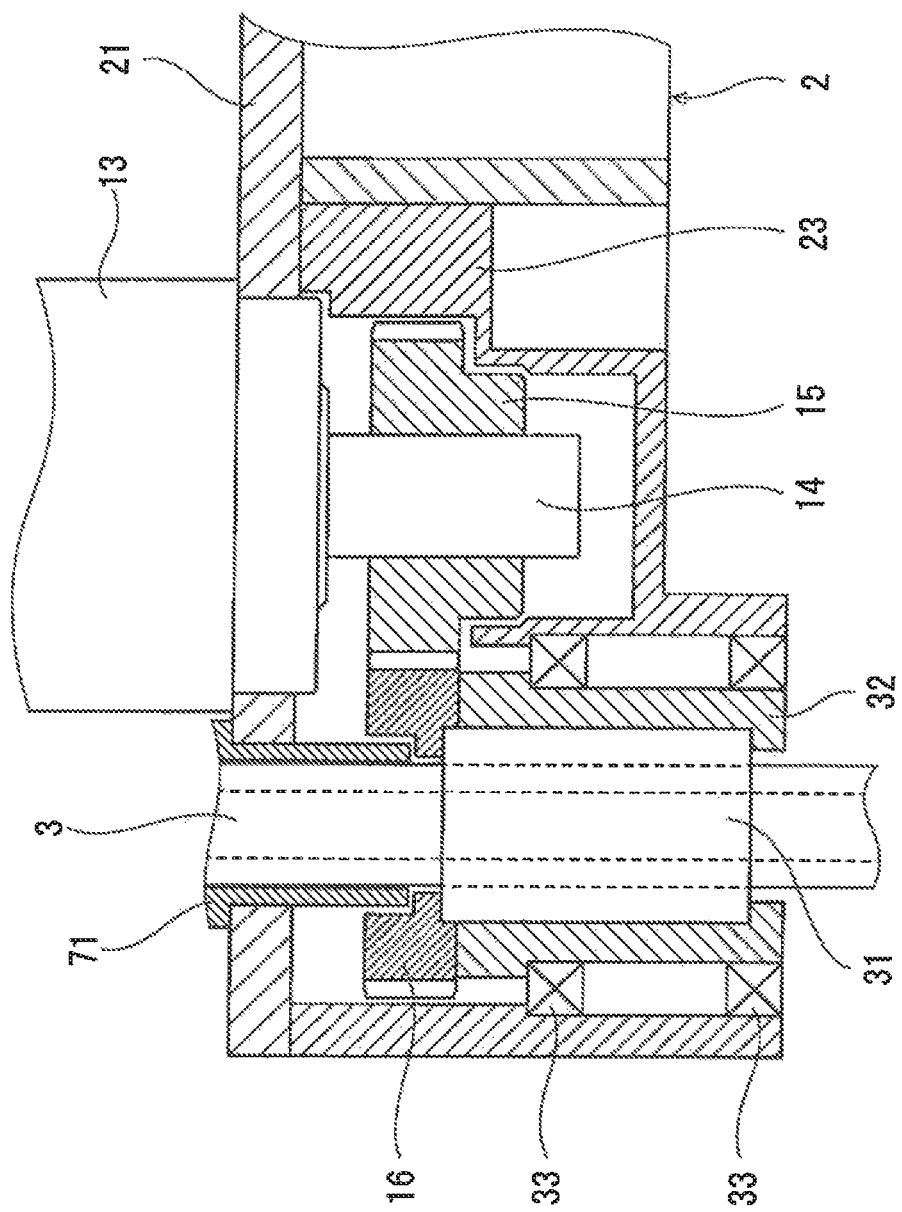
FIG. 3 is a cross-sectional view taken along a line III-III of FIG. 2.

As illustrated in FIGS. 1 to 3, the carrier 2 includes a top plate 21 having a substantially rectangular shape parallel to a horizontal plane, a pedestal 22 for connecting with the wrist part 10 of the robotic arm, which is fixed to an upper surface on one end side of the top plate 21 (right side in FIGS. 1 and 2), and a housing 23 fixed to an undersurface on the other side of the top plate 21. The spindle 3 penetrates the housing 23 and the top plate 21.

A motor 12 which rotates the spindle 3 is attached to the top plate 21 through a transmission 13. An output shaft 14 of the transmission 13 is located inside the housing 23, and a drive gear 15 is fixed to the output shaft 14.

In this embodiment, the spindle 3 is configured to be axially movable with respect to the carrier 2. Specifically, a guide 31 is disposed inside the housing 23. The guide 31 fits onto the spindle 3 so as not to be rotatable and supports the spindle 3 so as to be axially slidable. The spindle 3 and the guide 31 are, for example, a ball-spline mechanism.

A driven gear 16 which meshes with the drive gear 15 described above is disposed above the guide 31. The driven gear 16 is fixed to the guide 31 by pinching the guide 31 with a cylindrical fixing member 32 which accommodates the guide 31. The fixing member 32 is rotatably supported by the housing 23 through a pair of bearings 33.

Figure 4:
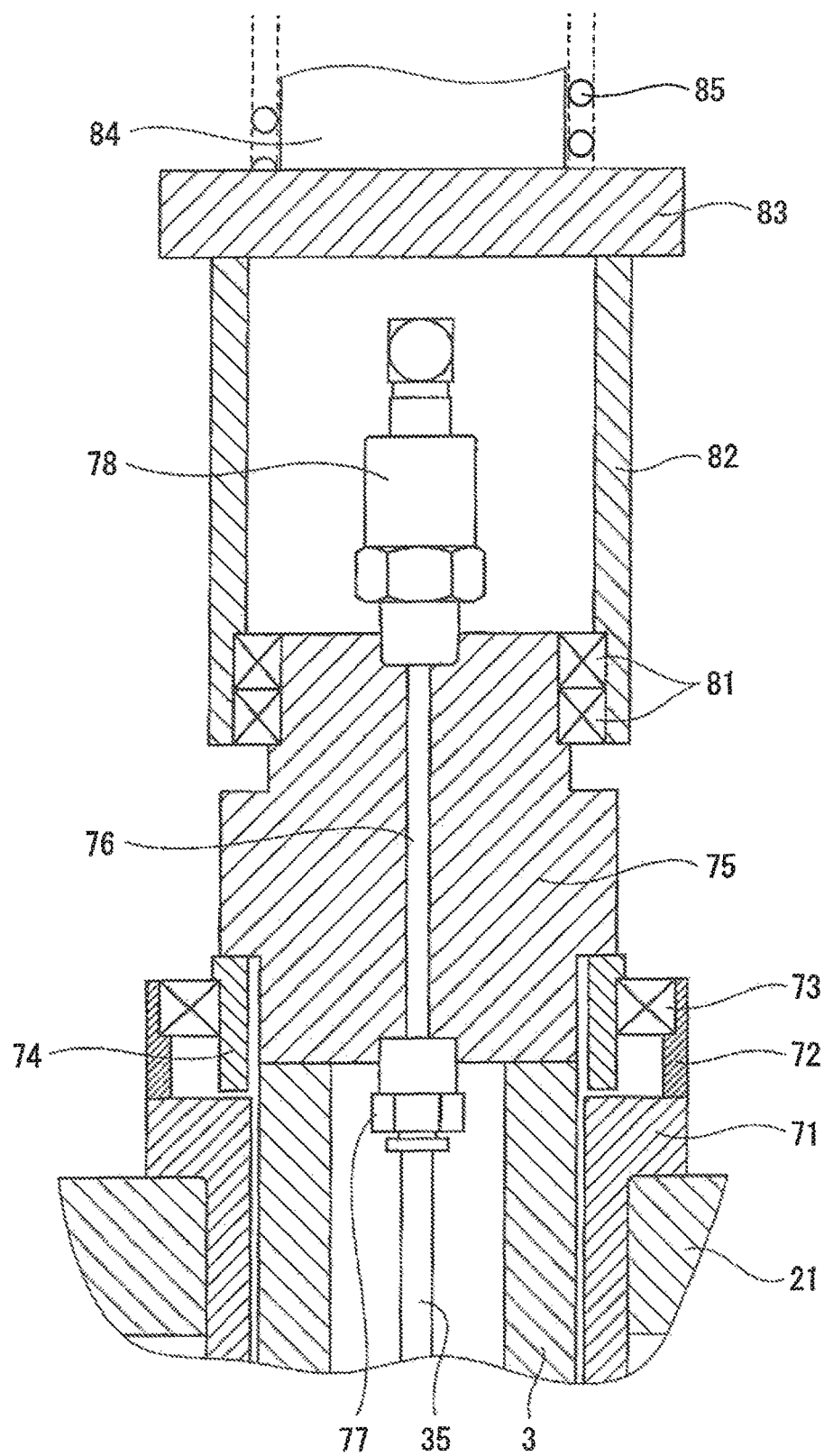
FIG. 4 is a cross-sectional view near an upper part of a spindle.

Furthermore, in this embodiment, the spindle 3 is biased toward the bit changer 4 by a spring 85 disposed at the side of the motor 12. As illustrated in FIG. 4, a stop member 75 is fixed to an end of the spindle 3 opposite from the bit changer 4. An upper part of the stop member 75 is rotatably supported by a cylindrical member 82 through a pair of bearings 81. A spring receiving plate 83 is fixed to an upper end of the cylindrical member 82, and a projection 84 which guides the spring 85 is formed in the spring receiving plate 83. On the other hand, a spring receiving plate 86 is disposed above the spring 85. The spring receiving plate 86 is fixed to the top plate 21 with four pillars 87. Note that, although illustration is omitted, a projection which guides the spring 85 is also formed in the spring receiving plate 86.

The stop member 75 normally contacts, by a biasing force of the spring 85, a collar 74 of which a relative position with respect the top plate 21 of the carrier 2 remains unchanged. A sleeve 71 which is fitted onto the spindle 3 is fixed to the top plate 21. A cylindrical member 72 is fixed to the sleeve 71 so as to extend upwardly from a perimeter edge portion of the sleeve 71. A bearing 73 is disposed between the cylindrical member 72 and the collar 74. In other words, the collar 74 is rotatably supported by the sleeve 71 through the bearing 73 and the cylindrical member 72.

Figure 5:
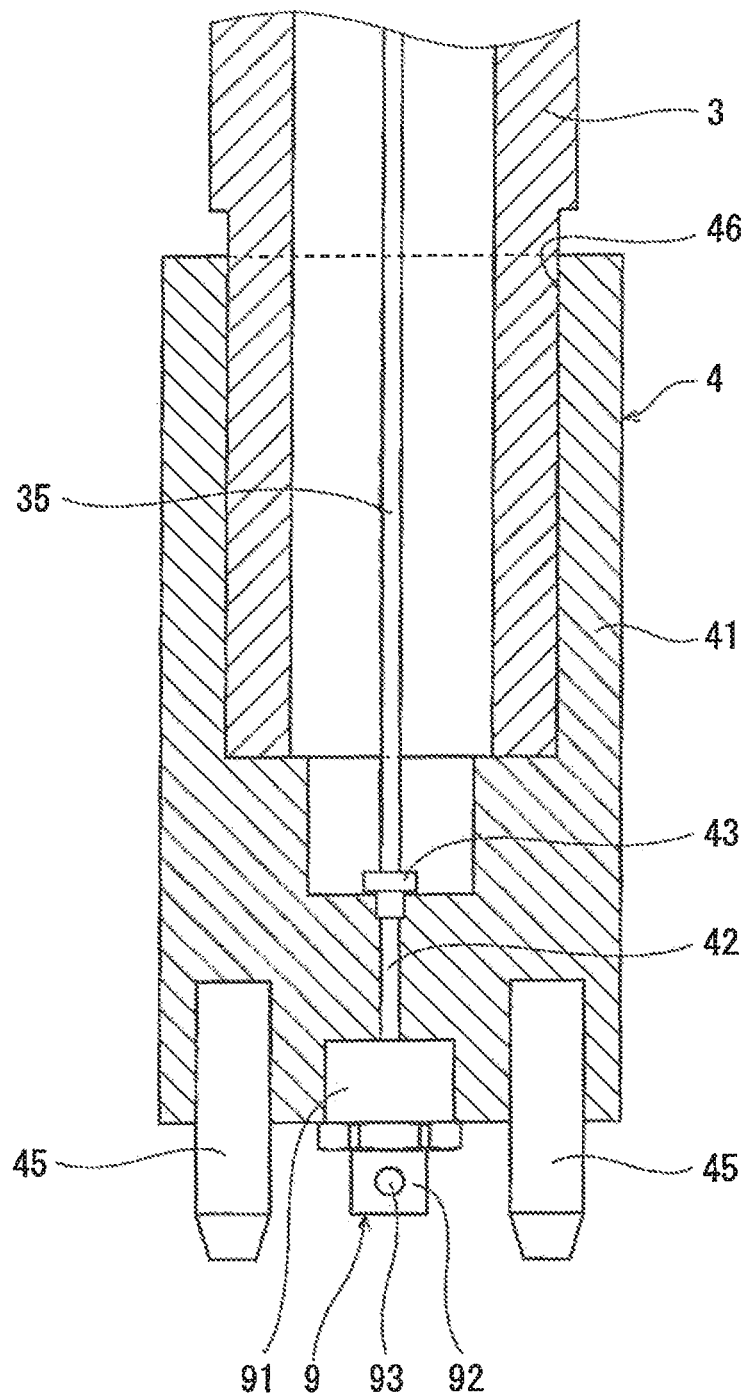
FIG. 5 is a cross-sectional view of a bit changer.
Figure 6:
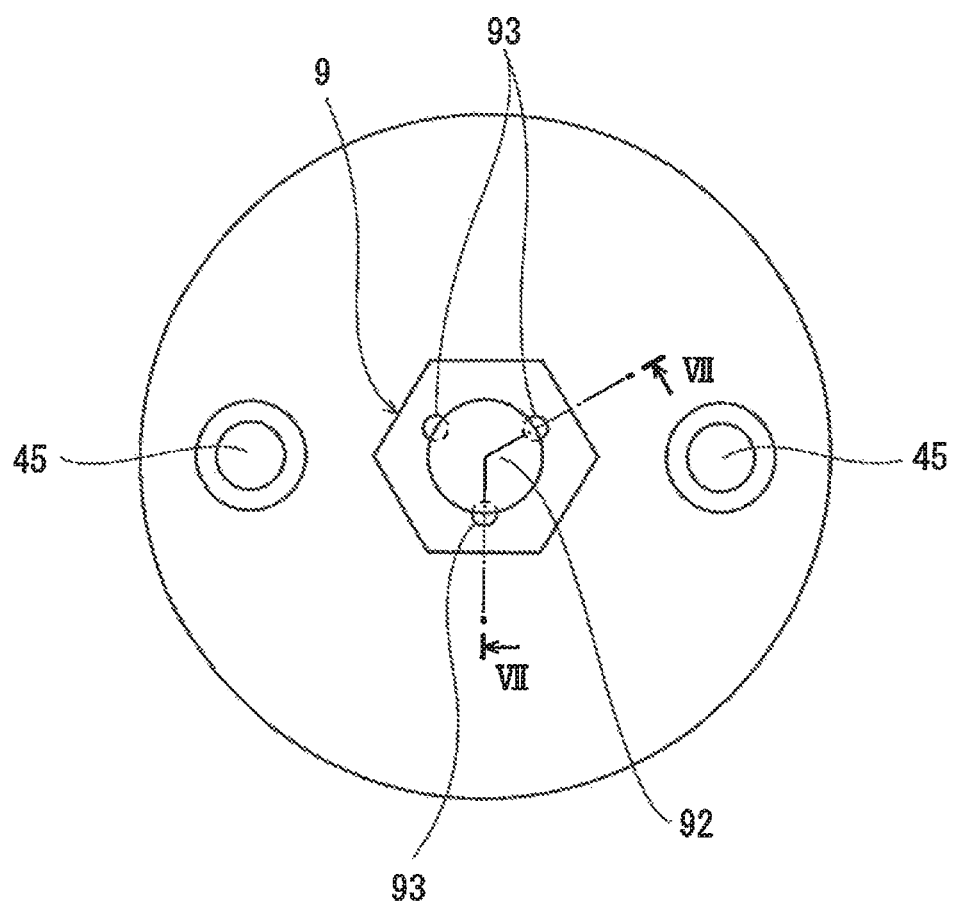
FIG. 6 is a bottom view of the bit changer.

As illustrated in FIGS. 5 and 6, the bit changer 4 described above includes a vertically-extending cylindrical bit changer main body 41, and an actuator 9 attached to an undersurface of the bit changer main body 41. A recess 46 is formed in an upper surface of the bit changer main body 41, and a lower part of the spindle 3 is inserted into the recess 46.

The actuator 9 includes a main body 91 embedded into the bit changer main body 41, an engaging shaft 92 projecting downwardly from the main body 91, and a plurality of operating pieces 93 (although three pieces in the illustrated example, two or four or more pieces are also possible) formed in the engaging shaft 92. In this embodiment, the actuator 9 is hydraulically driven (may be pneumatically driven or may be driven by the hydraulic oil). Thus, the spindle 3 is tubular, and a tube 35 which supplies hydraulic pressure to the actuator 9 is routed inside the spindle 3.

A channel 42 for operating fluid having the hydraulic pressure described above is formed in the bit changer main body 41 so that the channel 42 extends from the actuator 9 to the bottom of the recess 46. A connector 43 is provided to an upper end of the channel 42. A lower end of the tube 35 is connected to the connector 43.

As illustrated in FIG. 4, a channel 76 for operating fluid is also formed in the stop member 75, on the centerline of the stop member 75, and connectors 77 and 78 are provided to a lower end and an upper end of the channel 76, respectively. An upper end of the tube 35 is connected to the lower connector 77, and a tube (not illustrated) which penetrates the cylindrical member 82 is connected to the upper connector 78.

Returning to FIGS. 5 and 6, the operating pieces 93 are balls in this embodiment. Note that the actuator 9 may have only one ring-shaped operating piece.

The operating pieces 93 radially move between a retracted position where the operating pieces 93 are accommodated in the engaging shaft 92 and an engaging position where the operating pieces 93 protrude from the engaging shaft 92. In this embodiment, the actuator 9 maintains the operating pieces 93 at the engaging position when the hydraulic pressure is not supplied to the actuator 9 through the tube 35, while the operating pieces 93 are moved to the retracted position when the hydraulic pressure is supplied to the actuator 9 through the tube 35.

Figure 7:
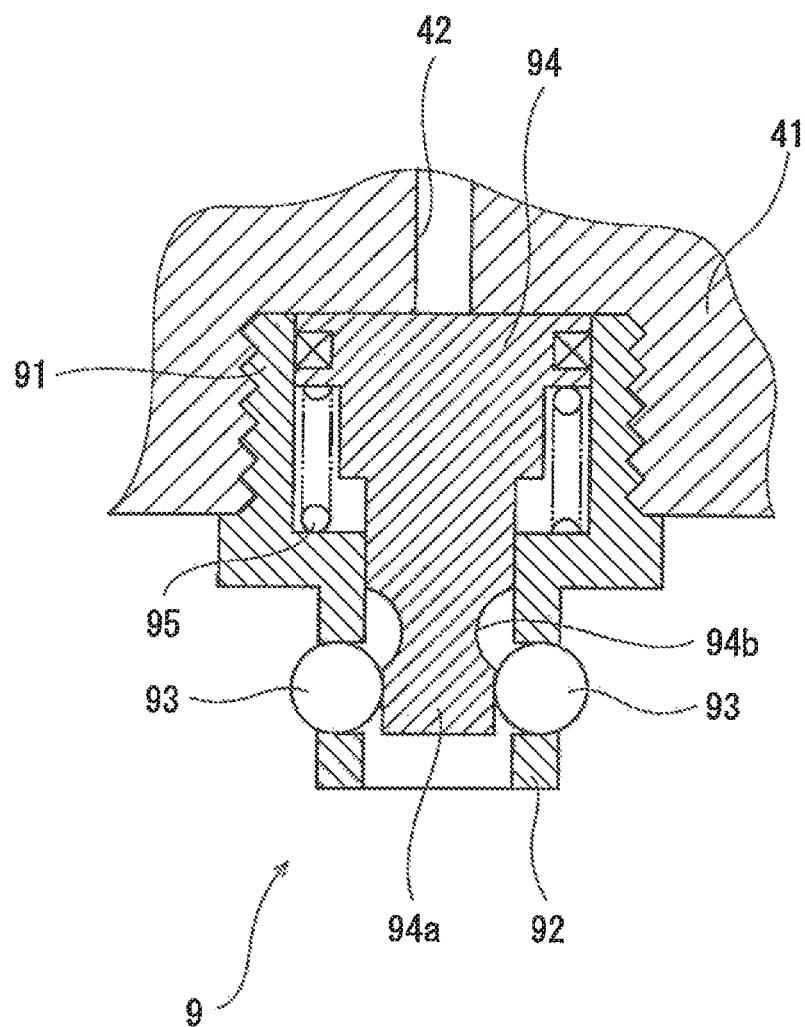
FIG. 7 is a cross-sectional view taken along a line VII-VII of FIG. 6.

Specifically, as illustrated in FIG. 7, the main body 91 and the engaging shaft 92 are hollow, and a pressure-receiving member 94 is disposed inside the main body 91 and the engaging shaft 92. The pressure-receiving member 94 includes a tip-end part 94a for maintaining the operating pieces 93 at the engaging position, and a recess 94b for moving the operating pieces 93 to the retracted position. The pressure-receiving member 94 is normally pushed against the bit changer main body 41 by a spring 95 so that the tip-end part 94a contacts the operating pieces 93. On the other hand, when the hydraulic pressure acts on the back side of the pressure-receiving member 94 through the channel 42, the pressure-receiving member 94 goes up and the operating pieces 93 fits into the recess 94b.

Figure 8:
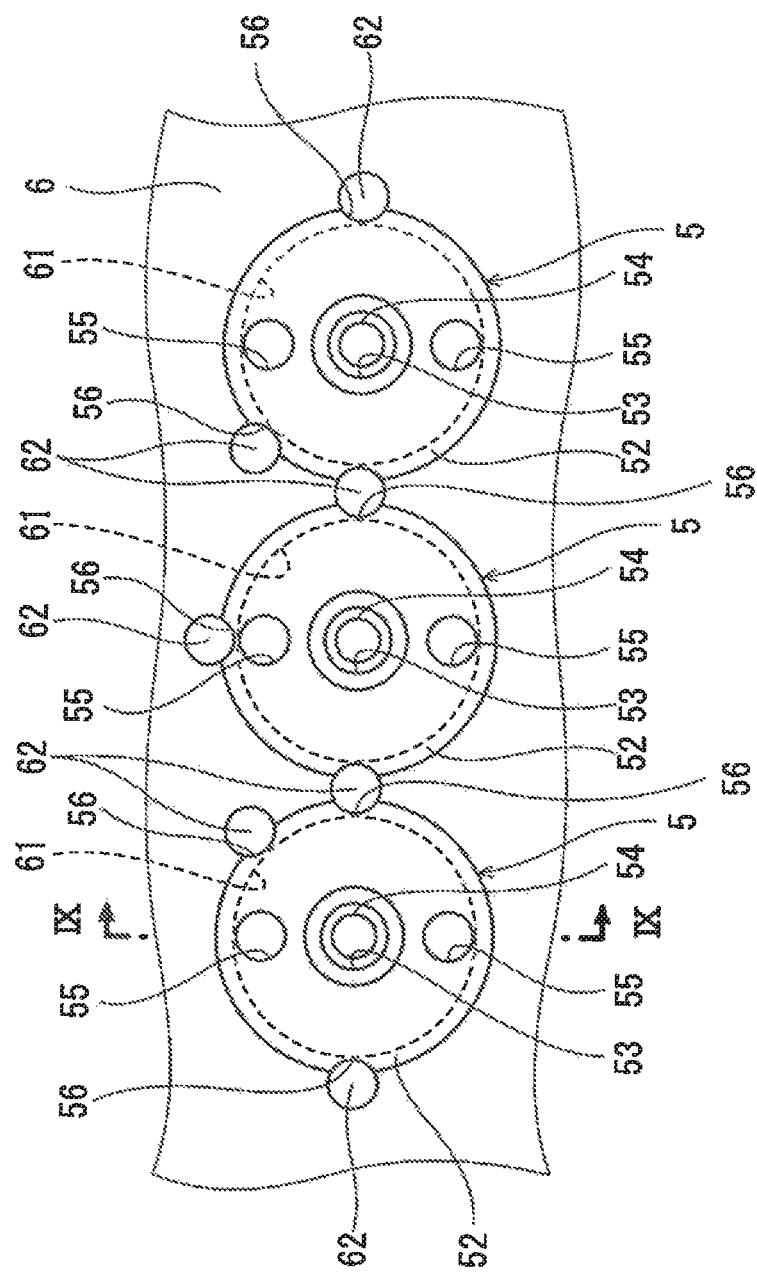
FIG. 8 is a plan view of the holder table.
Figure 9:
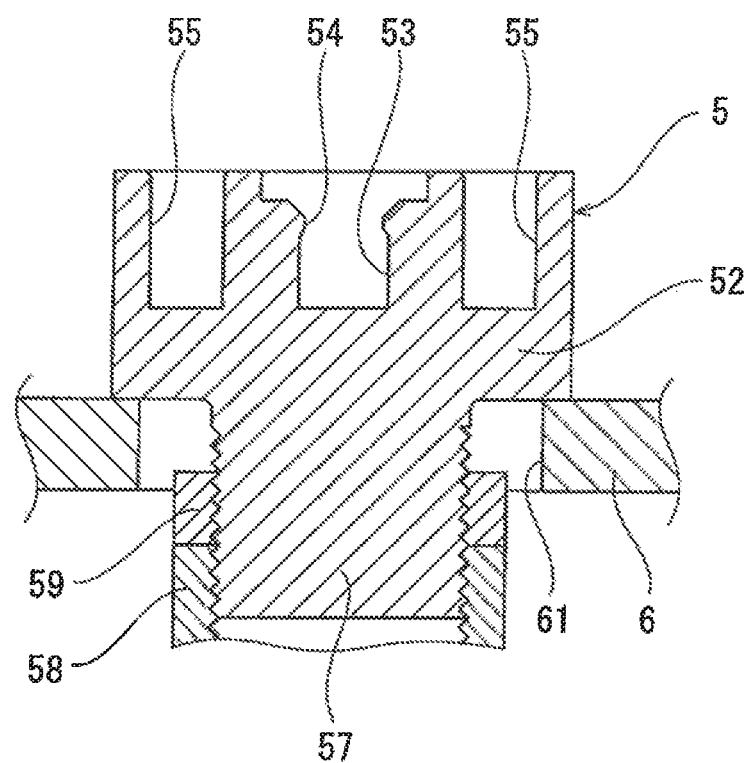
FIG. 9 is a cross-sectional view taken along a line IX-IX of FIG. 8.
Figure 10:
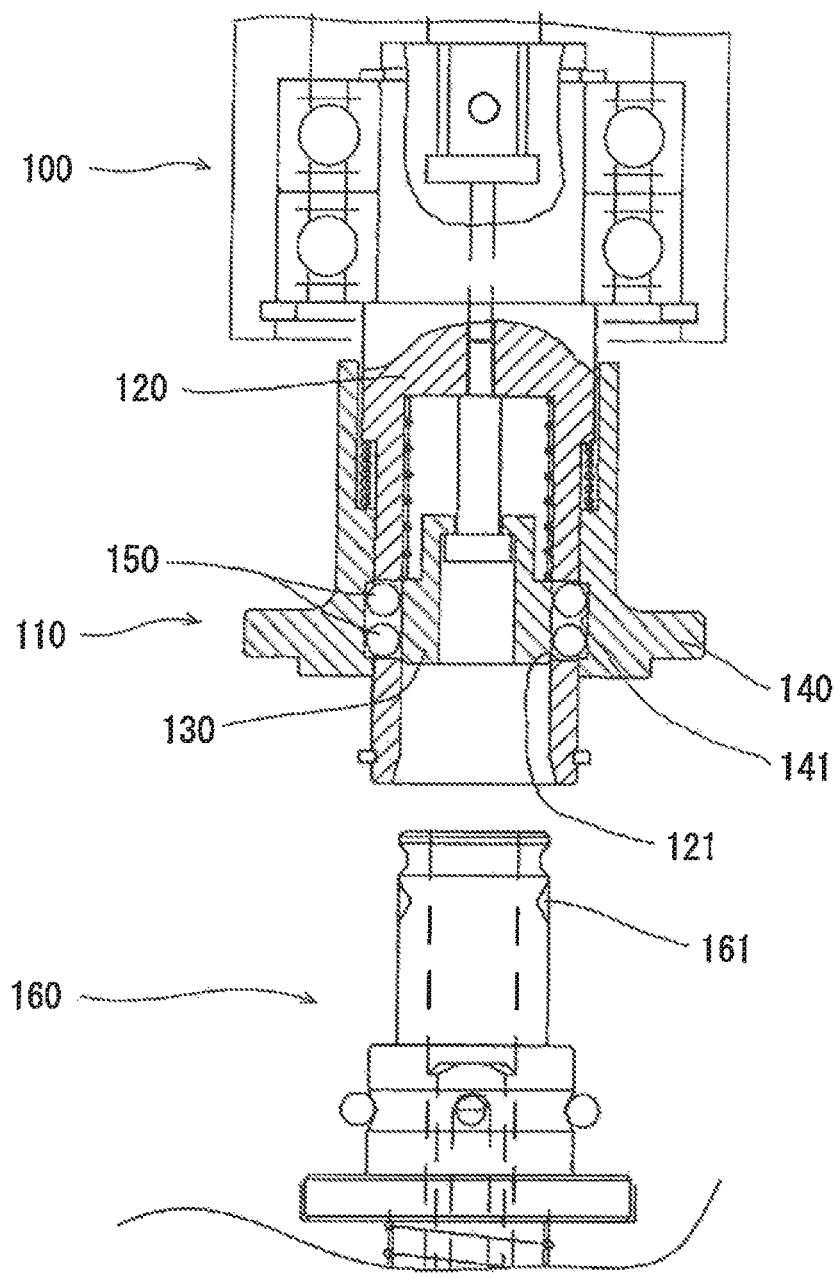
FIG. 10 is an enlarged view of part of a conventional nut runner system.
Figure 11:
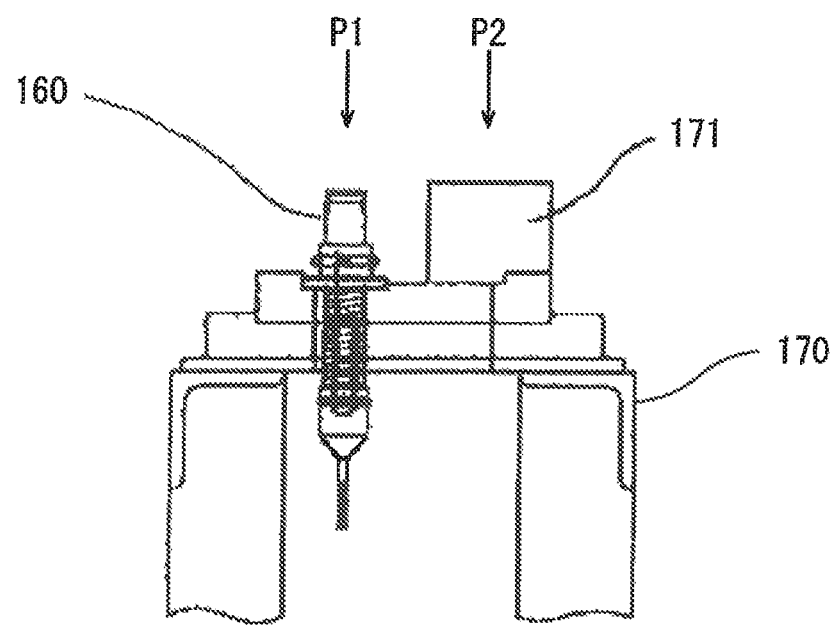
FIG. 11 is a side view of a holder table in the conventional nut runner system.

As illustrated in FIG. 1, each bit 5 described above has a tightening point 51 at one end (lower end), a coupling part 52 at the other end (upper end), and a main body 58 at the center. In this embodiment, as illustrated in FIGS. 8 and 9, the coupling part 52 is of a disk shape having a diameter larger than that of the main body 58.

Holder holes 61 are formed in the holder table 6 described above, into which the plurality of bits 5 are inserted, respectively. Diameter of the holder hole 61 is smaller than the diameter of the coupling part 52. Thus, the coupling parts 52 of the plurality of bits 5 are placed on the holder table 6.

At least two positioning slots 56 (three slots in the illustrated example) are formed at mutually different locations of a perimeter surface of the coupling part 52 of each of the plurality of bits 5. On the other hand, at least two positioning pins 62 (three pins in the illustrated example) which fit into the positioning slots 56 are formed in the holder table 6, corresponding to each bit 5. Thus, a faulty insertion of the bit 5 into the holder hole 61 by a worker is prevented. Note that, since the positioning pin 62 is shared by the adjacent bits 5, the total number of positioning pins 62 are not nine but seven.

An engaging hole 53 is formed in the coupling part 52 of each bit 5 so as to be coaxial with the tightening point 51. An annular protrusion 54 which continues in circumferential directions is formed in an inner circumferential surface of the engaging hole 53. The engaging shaft 92 of the actuator 9 described above is inserted into the engaging hole 53. Moreover, the engaging position of the operating pieces 93 described above is a position at which the operating pieces 93 protrude radially outward from the inner circumferential edge of the annular protrusion 54, while the retracted position described above is a position at which the operating pieces 93 are retracted radially inward from the inner circumferential edge of the annular protrusion 54.

Furthermore, two rotation-stop holes 55 parallel to the engaging hole 53 are formed in the coupling part 52 of each bit 5. Note that only one rotation-stop hole 55 may be formed. On the other hand, as illustrated in FIGS. 5 and 6, two rotation-stop pins 45 which are inserted into the rotation-stop holes 55, respectively, are formed in the undersurface of the bit changer main body 41.

Note that, as illustrated in FIG. 9, a screw stud 57 is integrally formed with the coupling part 52 of each bit 5, and the main body 58 threadedly engages with the screw stud 57. Furthermore, a fixing nut 59 which fixes the main body 58 threadedly engages with the screw stud 57.

According to the structure of this embodiment, when the operating pieces 93 are moved radially outward in a state where the engaging shaft 92 of the actuator 9 included in the bit changer 4 is inserted into the engaging hole 53 of the bit 5, the bit 5 can be attached to the bit changer 4. On the other hand, when the operating pieces 93 are moved radially inward, the bit 5 can be removed from the bit changer 4. Therefore, the bit 5 can be attached to and removed from the holder table 6 at the same location.

Moreover, in this embodiment, since the tube 35 is routed inside the tubular spindle 3, the tube 35 for the actuator 9 which is driven by the hydraulic pressure can be hidden inside the spindle 3 near the bit changer 4.

Furthermore, in this embodiment, since the operating pieces 93 move from the engaging position to the retracted position when the hydraulic pressure is supplied to the actuator 9, a fall of the bit 5 from the bit changer 4 can be prevented even if the hydraulic pressure is no longer supplied to the actuator 9 due to power failure etc.

Moreover, in this embodiment, since the spindle 3 capable of moving axially is biased toward the bit changer 4, it can prevent that the tightening point 51 of the bit 5 is pushed by an excessive force against a target screw to be tightened.

MODIFICATION

The present disclosure is not limited to the embodiment described above but various modifications are possible without departing from the spirit of the present disclosure.

For example, the spindle 3 is not necessarily constructed so as to be axially movable with respect to the carrier 2, but a relative position between the spindle 3 and the carrier 2 in the axial directions of the spindle 3 may be fixed.

Moreover, the rotation-stop structure of the bit 5 with respect to the bit changer 4 is not necessary to be the rotation-stop holes 55 and the rotation-stop pins 45. For example, an upper surface of the coupling part 52 of the bit 5 and an undersurface of the bit changer main body 41 may be formed so as to be unrotatably engaged with each other. Note that, if the rotation-stop holes 55 and the rotation-stop pins 45 are used like the embodiment, the bit changer main body 41 and the coupling part 52 of the bit 5 can be formed in simple shapes in which they contact each other with flat surfaces.

Moreover, the actuator 9 is not necessary to be driven by the hydraulic pressure but it may be driven by a solenoid, for example.

DESCRIPTION OF REFERENCE CHARACTERS

1 Nut Runner System
10 Wrist Part of Robotic Arm
11 Nut Runner Main Body

12 Motor
15 Drive Gear
16 Driven Gear
2 Carrier
3 Spindle
31 Guide
35 Tube
4 Bit Changer
45 Rotation-Stop Pin
5 Bit
51 Tightening Point
52 Coupling Part
53 Engaging Hole
54 Annular Protrusion
55 Rotation-Stop Hole
56 Positioning Slot
6 Holder Table
61 Holder Hole
62 Positioning Pin
71 Sleeve
73 Bearing
74 Collar
75 Stop Member
87 Spring
9 Actuator
92 Engaging Shaft
93 Operating Piece

What is claimed is:

1. A nut runner system, comprising:
a holder table having a tightening point at one end and a coupling part at the other end, and configured to hold a plurality of bits; and
a nut runner main body including a carrier coupled to a wrist part of a robotic arm, a spindle supported by the carrier, and a bit changer coupled to the spindle and to which one of the plurality of bits is to be attached,
wherein the coupling part of each of the plurality of bits has an engaging hole coaxial with the tightening point, and an annular protrusion that continues in circumferential directions is formed in an inner circumferential surface of the engaging hole,
wherein the bit changer includes an actuator, the actuator being comprised of an engaging shaft to be inserted into the engaging hole and operating pieces formed in the engaging shaft, the operating pieces moving between an engaging position at which the operating pieces protrude radially outward from an inner circumferential edge of the annular protrusion and a retracted position at which the operating pieces are retracted radially inward from the inner circumferential edge of the annular protrusion,
wherein a stop member is fixed to an end of the spindle opposite from the bit changer, and
wherein the nut runner main body includes a guide that unrotatably fits to the spindle and supports the spindle so as to be axially slidable, a driven gear fixed to the guide, a drive gear that meshes with the driven gear, and a spring that biases the spindle toward the bit changer, a sleeve fixed to the carrier and fitted onto the spindle, and a collar that is rotatably supported by the sleeve through a bearing and contacts the stop member.

2. The nut runner system of claim 1, wherein the actuator is driven by hydraulic pressure, and
wherein the spindle is of a tubular shape, and a tube through which the hydraulic pressure is supplied to the actuator is routed inside the spindle.

3. The nut runner system of claim 2, wherein the actuator maintains the operating pieces at the engaging position when the hydraulic pressure is not supplied to the actuator through the tube, while the actuator moves the operating pieces to the retracted position when the hydraulic pressure is supplied to the actuator through the tube.

4. The nut runner system of claim 1, wherein the coupling part of each of the plurality of bits has a rotation-stop hole parallel to the engaging hole, and
wherein the bit changer has a rotation-stop pin to be inserted into the rotation-stop hole.

5. The nut runner system of claim 1, wherein the holder table has holder holes into which the plurality of bits are inserted, and the holder table is constructed so that the coupling parts of the plurality of bits are placed on the holder table,
wherein the coupling parts of the plurality of bits are of a disk shape, and at least two positioning slots are formed in perimeter surfaces of the coupling parts at mutually different locations, respectively, and
wherein the holder table is provided, for each of the plurality of bits, with at least two positioning pins to be fitted into the at least two positioning slots.

* * * * *